Figure 1:
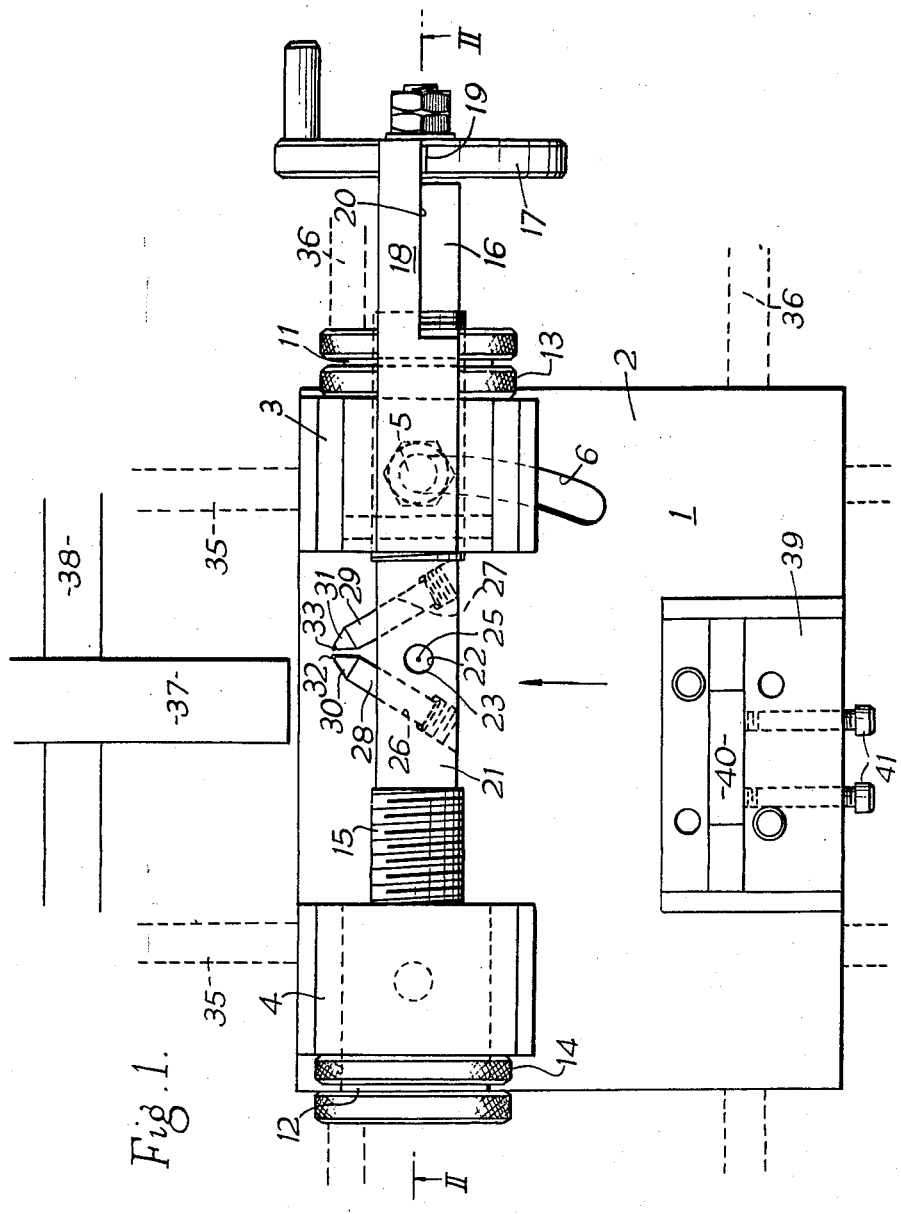

Aug. 27, 1963   J. AIRLIE   3,101,705
METHOD OF CUTTING AND DRESSING A GRINDING
WHEEL AND APPARATUS THEREFOR
Filed July 12, 1960   4 Sheets-Sheet 1

INVENTOR
John Airlie
BY
Karl W. Flocks
ATTORNEY

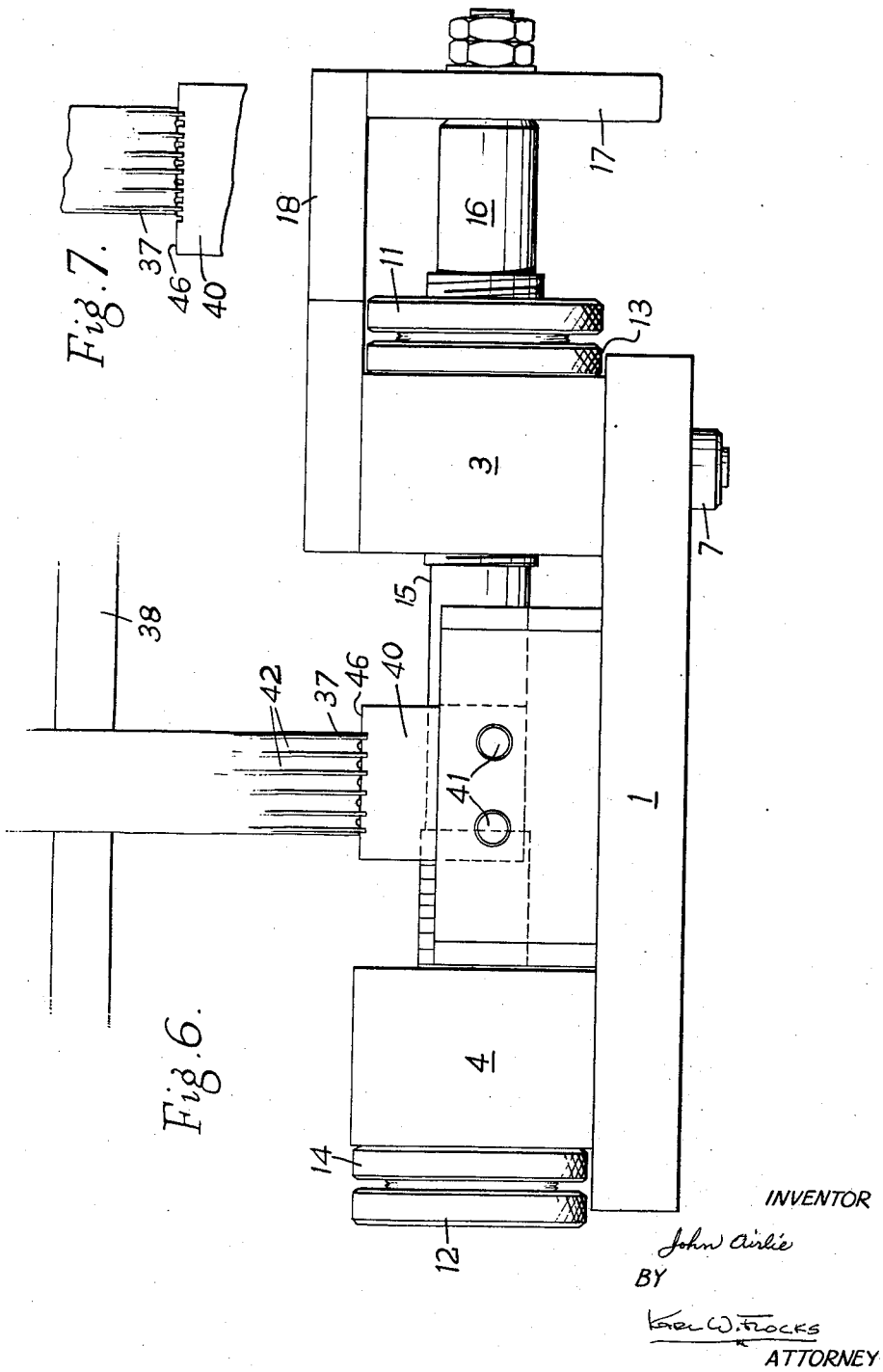

United States Patent Office 3,101,705
Patented Aug. 27, 1963

3,101,705
METHOD OF CUTTING AND DRESSING A GRINDING WHEEL AND APPARATUS THEREFOR
John Airlie, Glasgow, Scotland, assignor to Carrick Precision Tools Limited, a company of Great Britain
Filed July 12, 1960, Ser. No. 42,431
Claims priority, application Great Britain July 15, 1959
6 Claims. (Cl. 125—11)

This invention relates to a method of cutting and dressing a grinding wheel and apparatus therefor.

When it is desired to form in a workpiece a plurality of fine grooves it has been difficult in the past to obtain a high degree of accuracy with a grinding operation particularly when the dimensions of the grooves are small and the widths of the grooves are greater than their depth. In the specification of my co-pending patent application Serial No. 7,419 there is described an assembly for a press tool in the construction of which grooves are formed in a body portion by a grinding operation utilising a grinding wheel formed with peripheral fins which are spaced apart by a distance which is a multiple of the distance between the grooves and which in operation is indexed relative to the body portion in order to form adjacent grooves therein.

In order that the grooves may be formed with a high degree of accuracy it is necessary that the fins on the grinding wheel shall be cut with the same accuracy and furthermore shall be periodically dressed to maintain this accuracy.

It is therefore an object of the present invention to provide an improved method of and apparatus for cutting and dressing a grinding wheel.

According to the broadest aspect of the present invention there is provided a method of cutting on a rotating grinding wheel a series of parallel ribs comprising cutting a first groove in the wheel at a position spaced from the edge thereof in order roughly to define a first fin between the groove and the edge, simultaneously dressing each side face of the first fin and subsequently repeating the cutting and dressing operations at successive positions spaced from the preceding fin by the width of each fin until the desired number of fins has been cut and dressed.

The invention also provides apparatus for carrying out the method of the immediately preceding paragraph comprising a first cutter and a pair of second cutters spaced apart the width of a dressed fin, the first and second cutters being mounted in axially spaced relationship to extend radially away from a longitudinally movable shaft disposed on a mounting to be located adjacent the wheel and the shaft being movable relative to the mounting successively to bring the first and second cutters into fin cutting and dressing positions relative to the grinding wheel. Preferably the shaft is disposed on the mounting with a screw thread connection and the first and second cutters are displaced circumferentially of one another so that screwing movement of the shaft into first and second index positions brings said first and second cutters into said positions. Advantageously successive fins are cut and dressed by movement of the wheel relative to the mounting.

Figure 2:
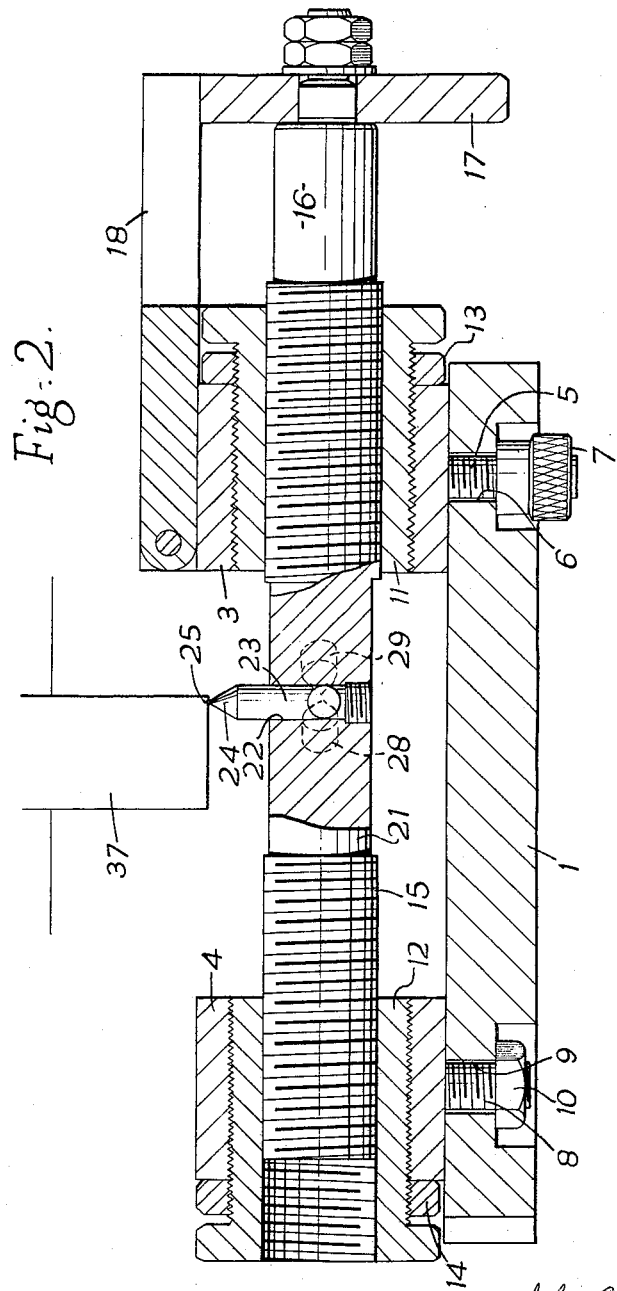
Figure 3:
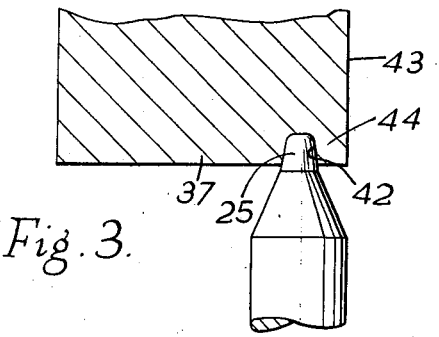
Figure 4:
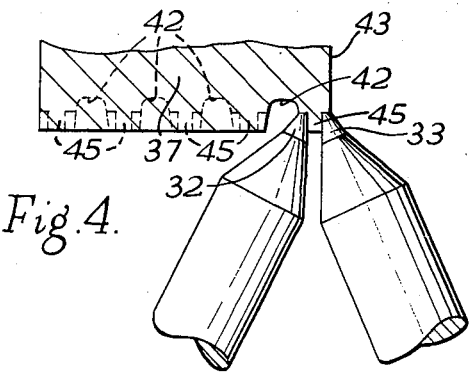
Figure 5:
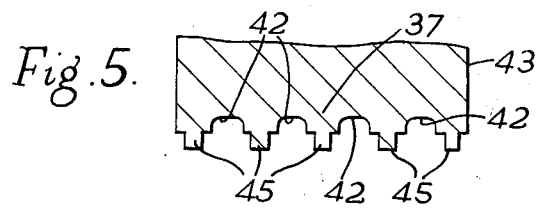

One embodiment of the invention will now be described by way of example with reference to the accompanying drawings in which:

FIG. 1 shows diagrammatically the apparatus in plan view,

FIG. 2 is a sectional view through the apparatus on the line II—II of FIG. 1 but with the shaft indexed to a different position, FIGS. 3, 4 and 5 are fragmentary views showing stages in cutting and forming a grinding wheel, FIG. 6 is an end elevational view of the apparatus showing a stage in the grinding of a workpiece, and FIG. 7 is a fragmentary view showing a further stage in the grinding of a workpiece.

Referring to FIGS. 1 and 2 of the drawings the apparatus comprises a base plate 1 to the upper face 2 of which a pair of internally threaded plummer blocks 3 and 4 are mounted co-axially in spaced apart relationship. The block 3 carries a bolt 5 which extends downwardly through an arcuate slot 6 in the base plate so as to be slidable therealong, the plummer block 3 being secured in any desired position by a nut 7. The plummer block 4 carries a bolt 8 extending through an aperture 9 in the base plate 1 and is secured by a nut 10 so as to be rotatable during movement of the bolt 5 along the slot 6.

The plummer blocks 3 and 4 respectively carry internally and externally threaded bushes 11 and 12 together with lock nuts 13 and 14 therefor and a threaded shaft 15 is carried within both bushes, an end 16 of the shaft extending axially beyond the bush 11 and having secured thereto an indexing wheel 17 for cooperation with an indexing arm 18 carried by the block 3. The periphery of the wheel 17 is formed with two indexing marks one of which is indicated at 19 for alignment with an edge 20 of the arm 18.

An intermediate portion 21 of the shaft is formed with a first diametral hole 22 to receive a diamond holder 23 the outer end 24 of which is tapered and carries a first diamond cutter 25.

The part 21 of the shaft is also formed with a pair of second holes 26 and 27 which lie in the same axial plane at right angles to the axis of the first hole 22 and are oppositely inclined to the axis of the shaft 15 at the same acute angle. The hole 26 is disposed axially on one side of the hole 22 and the hole 27 is disposed a greater distance axially on the other side of the hole 22. Diamond holders 28 and 29 are respectively mounted in the second holes 26 and 27 and their outer ends are tapered as at 30 and 31 to carry second diamond cutters 32 and 33. As shown in FIG. 1 the ends 30 and 31 are so tapered that they define a space 34 between them having parallel side walls in the plane containing the axes of the shaft 15 and the hole 22 and the disposition of the second holes 26 and 27 is such that this space is axially displaced relative to the first diamond cutter 25.

It will be assumed that the base plate 1 is mounted on a table capable of being moved along two sets of guides mutually at right angles the positions of which are indicated in dotted lines at 35 and 36 beneath a grinding wheel 37 mounted on a shaft 38. The details of the construction of the grinding machine and of mechanism for driving the shaft 38 form no part of the present invention and will not therefore be described.

The base plate 1 also carries a workpiece holder 39 in which a workpiece 40 is shown secured by screws 41.

The shaft 16 is indexed by means of the wheel 17 so that the first cutter 25 extends vertically upwards away from the base plate 1. This position is shown in FIG. 1 of the drawings and the base plate 1 is then moved along the guides 35 to pass beneath the wheel 37 and cut a groove in the periphery of the latter. This cutting operation is shown in greater detail in the fragmentary view in FIG. 3 where the cutter 25 has cut a peripheral groove 42 spaced from the side face 43 of the wheel 37 to define a roughly formed fin 44. Thereafter the shaft 16 is indexed through 90° until the cutters 32 and 33 extend normally away from the base plate 1 and the base plate 1 is again passed beneath the wheel 37. The axial spacing of the cutters 32 and 33 relative to the cutter 25 is such that in their operative position cutters 32 and 33 embrace the roughly formed fin 44 and dress it as shown in FIG.

4 at 45. Thereafter successive indexing operations of the wheel 17 and movement of the base plate 1 cause the cutter 25 and the cutters 32 and 33 to form further grooves 42 and dress further roughly formed fins 45 as shown in dotted lines in FIG. 4. The finished wheel with fine dressed fins 45 is shown in FIG. 5.

After cutting the wheel 37, the wheel 17 is then indexed to such a position that all the cutters are out of the path of the wheel 37 and the base plate 1 is then moved to bring the workpiece 40 beneath the wheel as shown in FIG. 6 so that the fins 45 cut corresponding grooves in the upper surface 46 of the workpiece. The base plate 1 and wheel 37 are then moved axially relative to each other by means (not shown) and a further series of grooves cut by the fins 45 as shown in FIG. 7, the further series of grooves being between those in the first operation.

As successive workpieces 40 are formed with grooves the cutters 32 and 33 may be indexed periodically to dress the fins 45 as the latter wear so that the grooves formed in the workpiece are maintained to a high degree of accuracy.

What I claim is:

1. A method of cutting on a rotating grinding wheel a series of discrete parallel circumferential fins comprising cutting a first groove in the wheel at a position spaced from the edge thereof in order roughly to define a first fin between the groove and the edge, dressing both side faces of the first fin simultaneously with cutters inclined at opposite angles to a radius of the grinding wheel, and subsequently repeating the cutting and dressing operations at successive positions spaced from the preceding fin by the width of each fin until the desired number of fins has been cut and dressed.

2. Apparatus for cutting on a rotating grinding wheel a series of discrete parallel circumferential fins and dressing same comprising a shaft disposed on a mounting to be located adjacent the wheel, a first cutter mounted on said shaft and positioned to cut a fin on the grinding wheel, a pair of second cutters spaced apart the width of a dressed fin mounted on said shaft and positioned to dress said fin, said first and second cutters being mounted on said shaft in axially spaced relationship to extend away therefrom, and means for moving said shaft longitudinally relative to the mounting successively to bring said first and second cutters into fin cutting and dressing positions relative to the grinding wheel.

3. Apparatus according to claim 2 comprising a screw thread connection between said shaft and said mounting, said first and second cutters being displaced circumferentially of one another so that said shaft may be screwed from a first to a second index location respectively to bring said first and second cutters into said positions.

4. Apparatus for cutting on a rotating grinding wheel a series of discrete parallel circumferential fins comprising a shaft disposed on a mounting to be located adjacent the wheel, a first cutter mounted at the tapered outer end of a holder supported in a first diametrical hole in the shaft, a pair of second cutters spaced apart the width of a dressed fin and respectively mounted at the tapered outer ends of holders respectively supported in a pair of second holes in said shaft which second holes lie in the same axial plane at right angles to the axis of the first hole and are oppositely inclined to the axis of the shaft at the same acute angle, said first and second cutters being in both axially and circumferentially spaced relationship, and screw thread means between the shaft and the mounting to permit said shaft to be screwed from a first to a second index location to bring said first and second cutters into said positions.

5. Apparatus according to claim 4 in which one of said second holes is disposed axially on one side of said first hole and the other of said second holes is disposed a greater distance axially on the other side of said first hole.

6. Apparatus according to claim 4 in which the outer ends of the holders for said cutters are tapered to define a space between them having parallel side walls and the disposition of the second holes is such that said space is axially displaced relative to the first cutter.

References Cited in the file of this patent

UNITED STATES PATENTS

| | | |
|---|---|---|
| 1,721,103 | Candee | July 16, 1929 |
| 1,886,796 | Drake et al. | Nov. 8, 1932 |
| 2,776,529 | Osplack | Jan. 8, 1957 |
| 2,777,260 | Mahlmeister | Jan. 15, 1957 |
| 2,914,058 | Sommer | Nov. 24, 1959 |